United States Patent
Tiberghien et al.

(10) Patent No.: US 6,479,783 B2
(45) Date of Patent: Nov. 12, 2002

(54) ELECTRIC MOTOR DEVICE FOR POWERING A TOOL CLAMP

(75) Inventors: Olivier Tanguy Tiberghien, Semblancay (FR); Hervé Jean Plot, Le Mans (FR)

(73) Assignee: ARO (FR)

(*) Notice: Subject to any disclaimer, the term of this patent is extended or adjusted under 35 U.S.C. 154(b) by 0 days.

(21) Appl. No.: 09/821,153

(22) Filed: Mar. 30, 2001

(65) Prior Publication Data

US 2002/0014474 A1 Feb. 7, 2002

(30) Foreign Application Priority Data

Mar. 31, 2000 (FR) .............................. 00 04122

(51) Int. Cl.[7] ................................. B23K 9/28
(52) U.S. Cl. ..................... 219/86.32; 219/161
(58) Field of Search .................. 219/161, 80, 86.1, 219/86.32, 91.2, 158; 310/12, 20

(56) References Cited

U.S. PATENT DOCUMENTS

| | | | |
|---|---|---|---|
| 3,744,032 A | * | 7/1973 | Engelberger et al. |
| 3,802,713 A | | 4/1974 | Levy |
| 4,438,309 A | * | 3/1984 | Zimmer |
| 4,485,959 A | * | 12/1984 | Orlando et al. |
| 4,947,070 A | * | 8/1990 | Hill et al. |
| 5,510,593 A | * | 4/1996 | Sakai |
| 5,598,044 A | * | 1/1997 | Satomi et al. |
| 5,747,896 A | * | 5/1998 | Nagai et al. |
| 5,924,518 A | * | 7/1999 | D'Onofrio |
| 6,047,799 A | | 4/2000 | Ahnert et al. |
| 6,075,298 A | * | 6/2000 | Maue et al. |
| 6,081,051 A | * | 6/2000 | Kitazawa et al. |
| 6,084,326 A | * | 7/2000 | Nagai et al. |
| 6,204,585 B1 | * | 3/2001 | Riello et al. |
| 6,225,590 B1 | * | 5/2001 | Farrow |
| 6,239,530 B1 | * | 5/2001 | Garcia |
| 6,337,456 B1 | * | 1/2002 | Taniguchi et al. |

FOREIGN PATENT DOCUMENTS

| | | |
|---|---|---|
| DE | 197 49 681 | 5/1998 |
| EP | 0 924 038 | 6/1999 |

* cited by examiner

*Primary Examiner*—Tom Dunn
*Assistant Examiner*—Kiley Stoner
(74) *Attorney, Agent, or Firm*—Larson & Taylor, PLC

(57) ABSTRACT

An electric motor device for powering a tool clamp, for example a resistance welding clamp, of the type comprising a casing of an electric motor 4 the shaft of which is connected to the clamp, to control the electrodes for opening, closing and clamping them onto a metal sheet, by a system of the through-the-motor type which converts the rotary motion of the shaft into translational motion of a mechanism 5 operating the clamp, this motor being linked to a control variator and a slaving device 10 coupled to the rotor of the motor. The device 10 being arranged at the end of the motor shaft, the shaft is fitted with a gear wheel 14 which can be operated from the outside, for rotating it manually, through at least one opening 15 in the casing offset with respect to the motor shaft.

7 Claims, 7 Drawing Sheets

ELECTRIC MOTOR DEVICE FOR POWERING A TOOL CLAMP

The invention relates to an electric motor device for powering a tool clamp, of the type comprising a casing of an electric motor the shaft of which is connected to the clamp, to control tools carried by articulated arms, opening them, closing them and clamping them onto a part, by a system of the through-the-motor type which converts the rotary motion of the shaft into translational motion of a mechanism operating the clamp, this motor being linked to a slaving device coupled to the rotor of the motor, these being themselves connected to a control variator.

The application might for example be a resistance welding clamp, the tools mentioned above being then constituted by spot welding electrodes. It might also be any other tool such as a riveting, clinching or punching machine in which the tools are clamped onto a part to be processed at a given moment. In the case of a welding clamp, this might for example be a clamp in which the arms carrying the electrodes are of the so-called "C" type or "scissors" type, it being necessary in all cases, to control the movements of this clamp, whether a welding clamp or some other kind, to convert the rotation of the motor shaft, by a screw-and-nut system or similar, into translational motion of a mechanism operating the clamp. This type of electric motor power, easier to slave, is tending to replace the provision of power by hydraulic or pneumatic jacks. The principle and the advantages of devices of this type have been indicated in particular in French patent no. 85 12239 on behalf of the applicant, describing a numerically controlled resistance welding machine.

The function of the control variator mentioned above is to supply current to the motor to cause it to rotate during the dynamic phases of movement of the tool-carrying arms (opening or closing the clamp) and, in the static phase, to cause it to apply a torque converted by this motion conversion system into a force clamping the tools onto the part, for example a sheet of metal to be welded.

As to the slaving device already mentioned, of the analogue (resolver) or digital (encoder) type, this is coupled to the rotor of the motor and its function is to provide the control variator with information on the position and speed of the rotor of the motor, thus slaving it.

As regards the production of such machines, there are several concepts for providing motor power, namely using a system for converting rotary motion into translational motion of the type separate from the motor or of the through-the-motor type. For the sake of simplicity, it will be assumed that screw-and-nut systems are used, but it goes without saying that the principles of the invention will remain valid for any other type of motion conversion system, using a rack and pinion, for example, or other means.

According to the concept of the separate type, shown as an example in FIG. 1, the axis of the screw 1, engaged with a nut 2 capable of translational motion in the body 3 of the device, is parallel to the axis 4a of the electric motor 4. The clamp operating mechanism, not shown, is designated 5 and has a motion-transmitting link to the nut 2 via the part 5a. Consequently, the output shaft 6 of the motor 4 must be connected to the head of screw 1 by some kind of system for transmitting rotary motion, for example using gears or a toothed belt and pulleys, the system as a whole being designated 7. This design means that there is easy access to the head of the screw 1 from the end casing 8 after the closure plug 9 is removed from the casing. It is then possible to insert an appropriate key into a splined hole in the screw 1 to turn it manually, the motor 4 being stationary. This means that the screw 1 can be turned by hand, for example to make an adjustment to the clamp or to the electrodes or other tools. It will be noted that the device 10 for slaving the motor 4, located at the end of the motor casing, in no way hampers these operations.

On the other hand, this type of construction does have the disadvantages of requiring a large number of parts, being of considerable weight and size on a welding machine, and of being costly.

According to the concept of the through-the-motor type, i.e. using a through-the-motor screw, which does not have the same disadvantages and which is shown as another example in FIG. 2, the screw-and-nut system is directly integrated with the motor: here, the nut 2 is capable of rotational motion and is therefore directly integral with the rotor 11 of the motor 4, the stator of which is designated 12. The screw 1, engaged with this nut and capable of axial translational motion in the motor 4, has a projecting end 5 constituting the clamp operating mechanism. Here it will be noted that, contrary to the previous case, the device 10 for slaving the motor 4, still located at the end of the motor shaft and which may itself be masked by a printed circuit board 10a, prevents any access to the end of the rotor 11, and therefore prevents it being turned manually when the motor 4 is stationary, in order to turn the nut 2 and cause the screw 1 to move forward.

To eliminate this disadvantage, consideration might be given to changing the position of the device 10 for slaving the motor, away from the end of the shaft, offsetting it relative to the latter and linking the slaving device to the rotor of the motor by means of a gear wheel and pinion or a pulley and toothed belt assembly. The end of the shaft of the motor 4 would then again be accessible to be rotated manually, but this would still have the disadvantages of complexity of construction (additional parts), an increase in size and a higher manufacturing cost.

The aim of the invention is to eliminate all these disadvantages of the prior art, and therefore to obtain convenient access to the motor shaft to rotate it and thus move the clamp operating mechanism in translation manually, achieving this at lower cost and without increasing either the size or the weight of the equipment.

To this end, according to the invention, a device such as is defined at the outset is of the type using a through-the-motor system for converting rotary motion into translational motion and is characterised in that, the slaving device coupled to the rotor of the motor being arranged at the end of the motor shaft, the shaft is fitted with a gear wheel which can be operated from the outside, for rotating it manually, through an opening in the casing offset with respect to the motor shaft.

The gear wheel in question may be a bevel gear, and the axis of the opening may form a certain angle with the axis of the motor, for example an angle of 90°.

According to a variant, the gear wheel is cylindrical and meshes with a cylindrical pinion which can be operated through the opening, and the axis of the opening can then be parallel to the axis of the motor.

The gear wheel mentioned will advantageously be rotated by a key, and the end of this key may have a set of teeth which can engage with the gear wheel.

As a variant, the motor casing contains a set of teeth which can be operated through the opening and can be rotated by the key and at the same time be made to engage with the gear wheel on the end of the shaft, the set of teeth and gear wheel being disengaged from each other by the action of a spring or of inertia when the key is withdrawn.

According to another variant, provision may also be made for the motor casing to contain a set of teeth which can be operated through the opening and can be rotated by the key, this set of teeth being permanently engaged with the gear wheel mentioned.

Of course, all the gears involved may be of any appropriate type, for example spur, helical or angle, or a rack and worm screw may be used.

Two types of embodiment of the invention will now be described using examples which are in no way limiting, with reference to the other figures of the attached drawings in which:

BRIEF DESCRIPTION OF DRAWINGS

FIG. 3 uses the same reference numbers as FIG. 2 to designate the same components or components having the same function in both cases. It can be seen that at end of the motor with the slaving device 10, the end 13 of the shaft of the motor 4 has a bevel gear 14 which can be operated through an opening 15 in the motor casing, and its axis is aligned at 90° to that of the motor shaft, i.e. the axis of the rotor 11. When the motor 4 is stationary, the set of teeth 16 of a key 17 can be inserted through this opening 15, engaged with the gear wheel 14 and the rotor 11 of the motor and the nut 2 integral with it made to turn manually by pivoting the key 17 by means of the handle 18. It is then possible to adjust manually the distance between the two electrodes of a welding clamp, for example, by causing translational motion of the screw 1 (see also FIG. 4).

It should be noted that the set of teeth 16 could be housed permanently at the bottom of the opening 15, could be held there in the unengaged position by a return spring or by its inertia, and be made to engage with the gear wheel 14 only when a key without teeth but shaped to make the set of teeth 16 rotate and thus drive the wheel 14 in rotation is inserted into the opening 15; this set of teeth could also be permanently engaged with the gear wheel 14.

Figure 1:
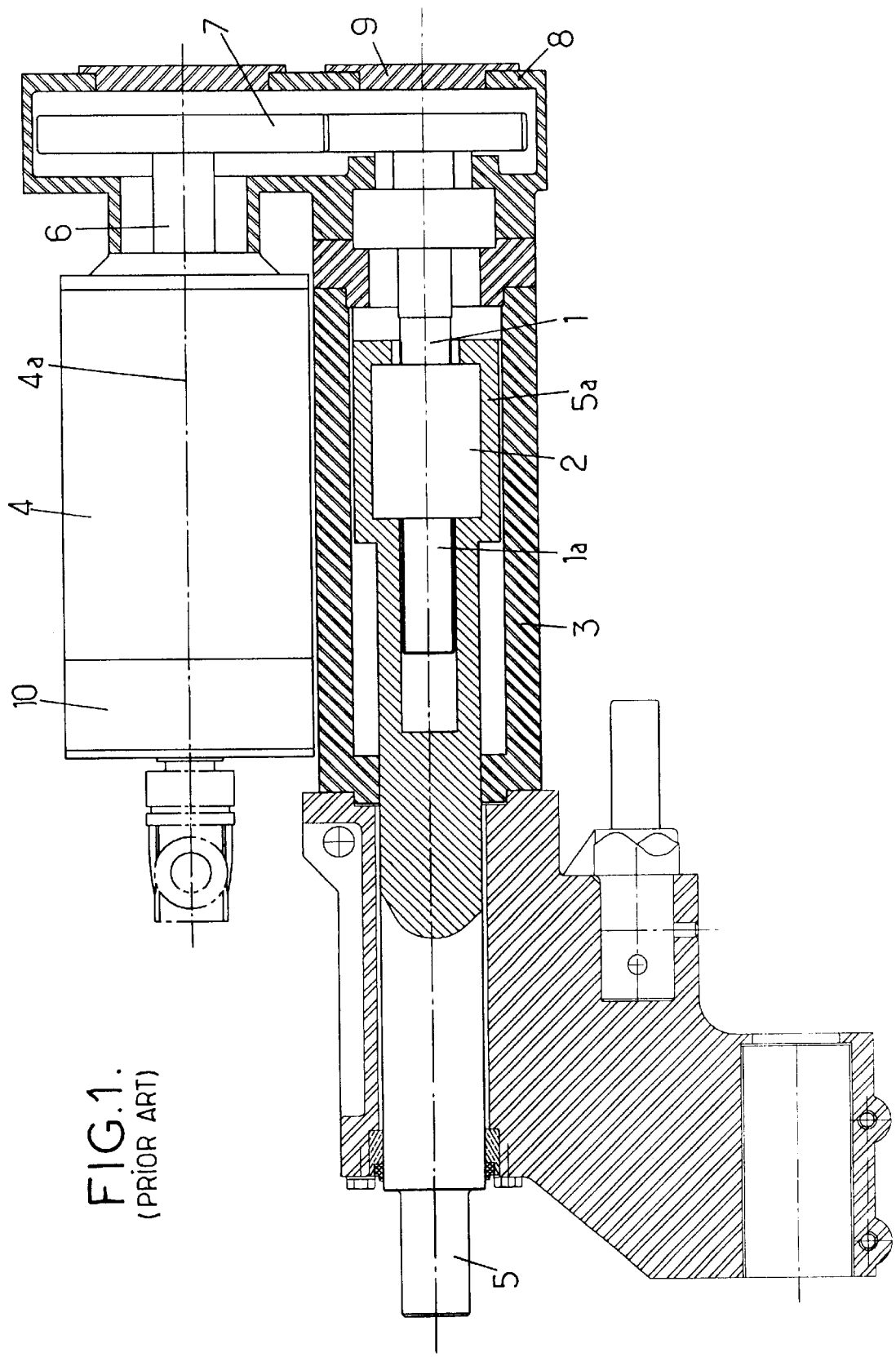
FIG. 1 shows a conventional separate type power motor.
Figure 2:
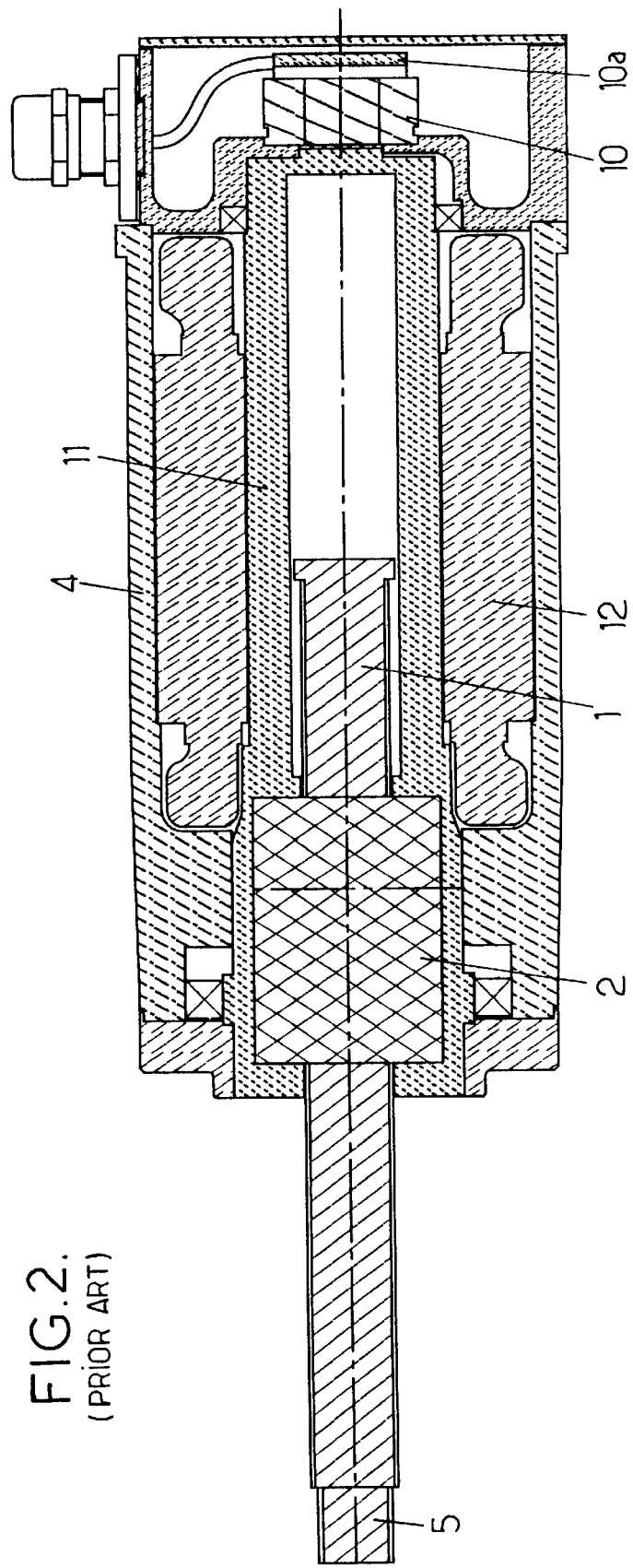
FIG. 2 shows a conventional through-the-motor type power motor.
Figure 3:
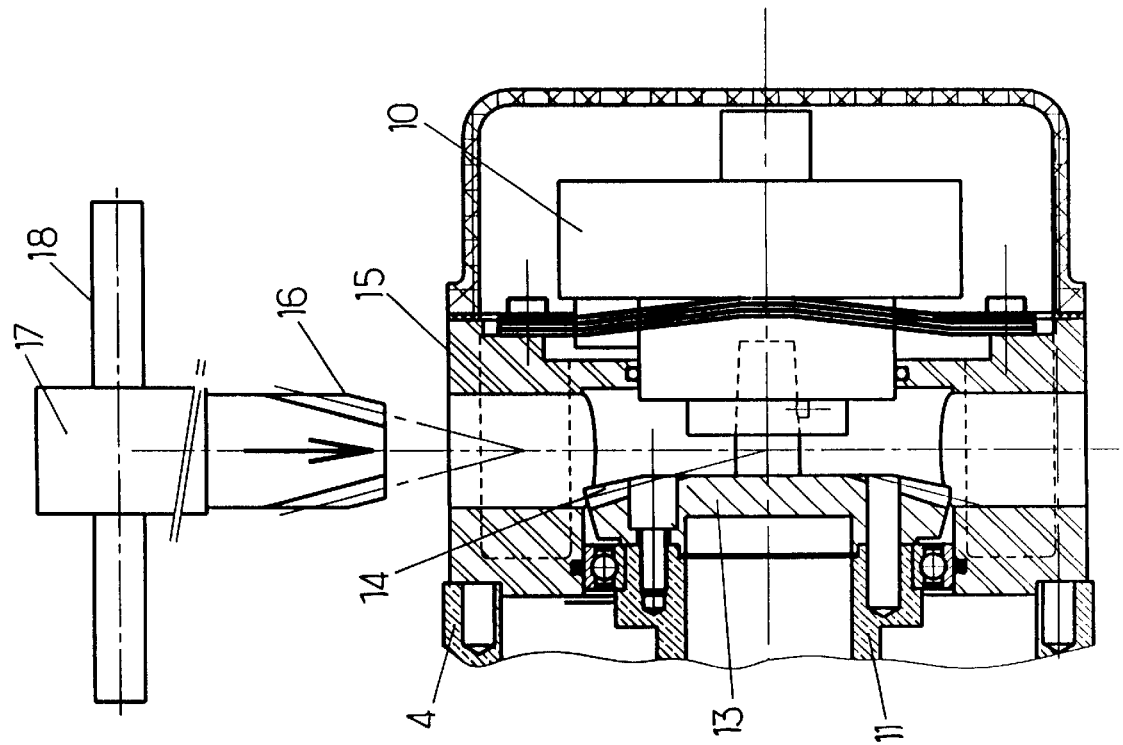
FIG. 3 shows a partial axial section of a device according to the invention, of the type having a bevel gear at the end of the motor shaft.
Figure 4:
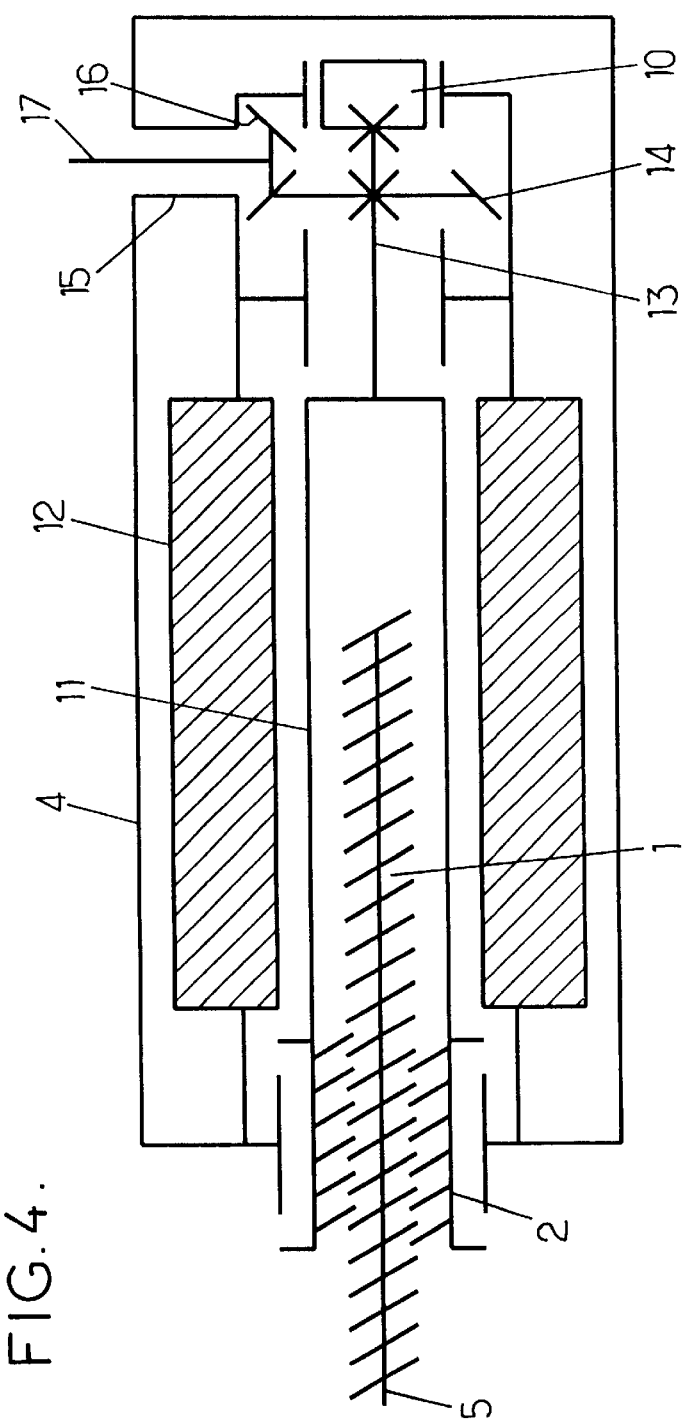
FIG. 4 is a complete schematic view of the same device shown in a simplified manner.
Figure 5:
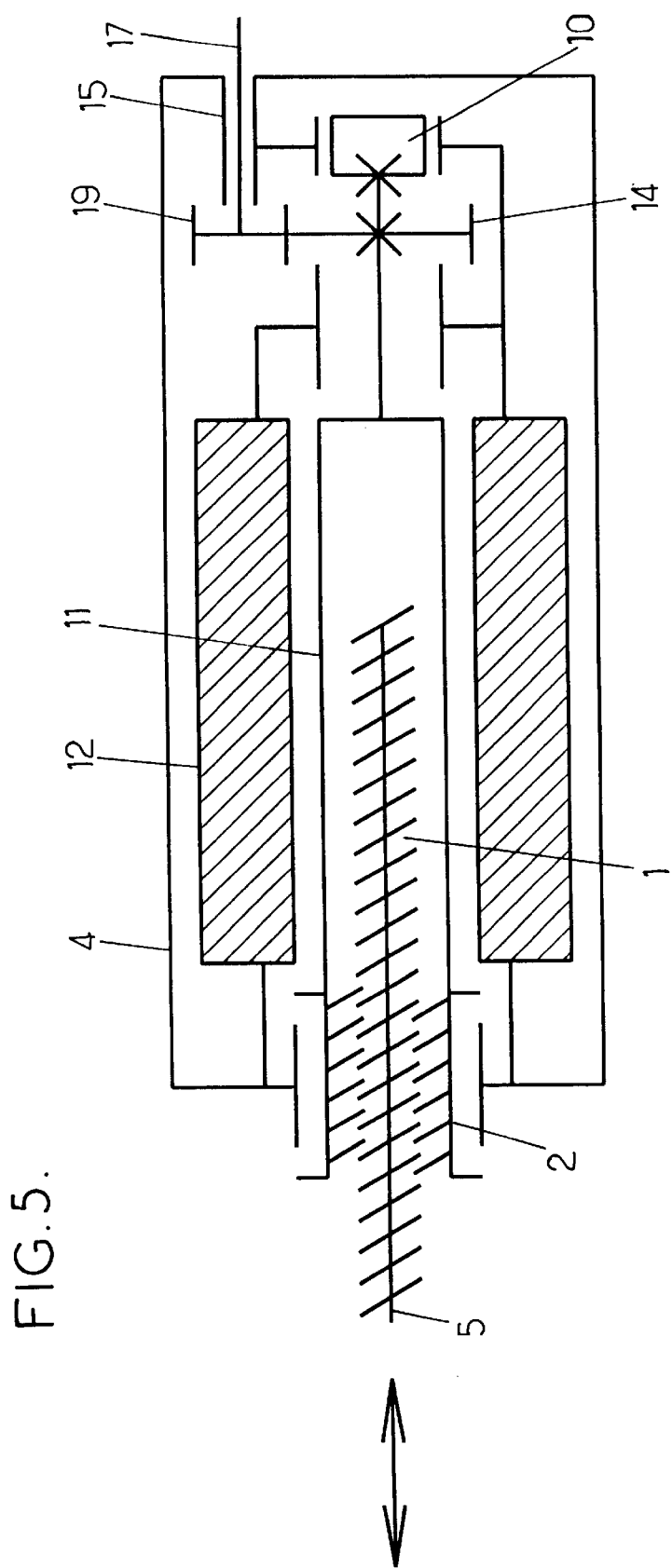
FIG. 5 shows a variant with a cylindrical gear wheel, also shown in a simplified manner.

In the embodiment in FIG. 5, an embodiment is shown according to which the gear wheel 14 is cylindrical and is meshed with a cylindrical pinion 19 which can be operated through an opening 15 in the motor casing, the axis of which is parallel to the axis of the motor 4. When the motor stops, it will then be possible to turn the pinion 19 with a key similar to the key 17, and therefore provide a manual drive rotating the gear wheel 14 as well as the rotor 11 and nut 2, thus causing translational motion of the screw 1.

Figure 6:
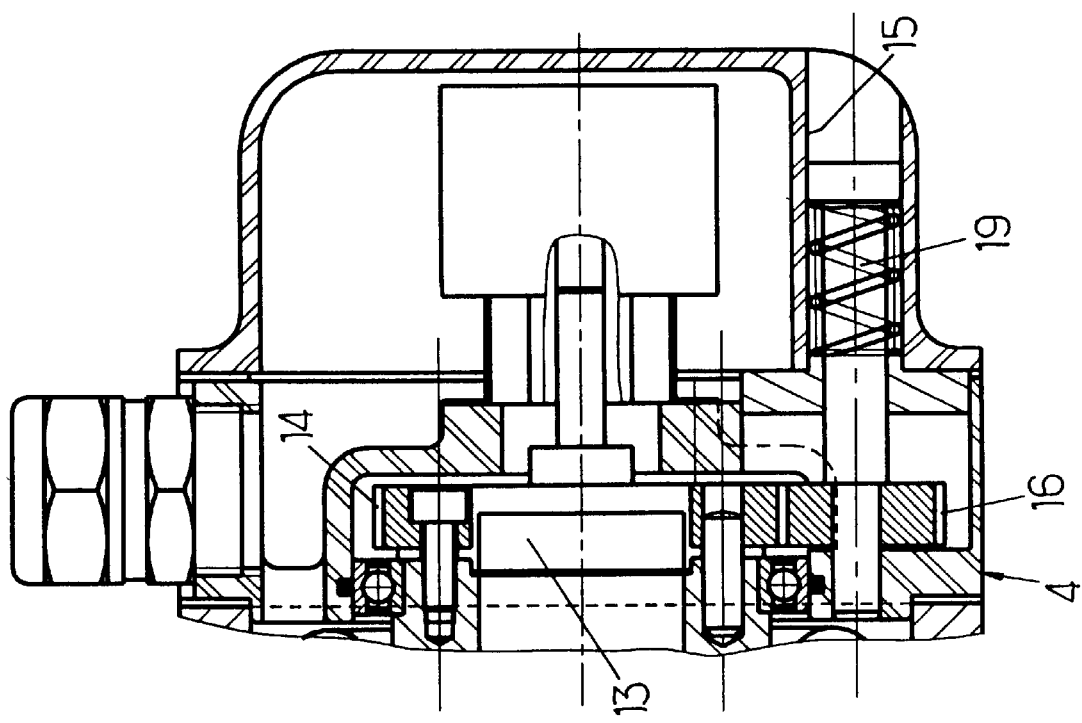
FIG. 6 is a view of a partial axial section of the cylindrical gear variant, according to which the motor casing contains a set of teeth which can be operated by a key and can be disengaged from the gear wheel on the motor shaft.

FIG. 6 shows the variant according to which the motor casing 4 contains a cylindrical set of teeth 16 which can be operated through the opening 15 and made to rotate by a key similar to key 17 but with no teeth, and at the same time can be made to engage with the cylindrical gear wheel 14 on the end of the shaft. The set of teeth 16 and gear wheel 14 are disengaged by the action of a spring 19 when the key is withdrawn.

Figure 7:
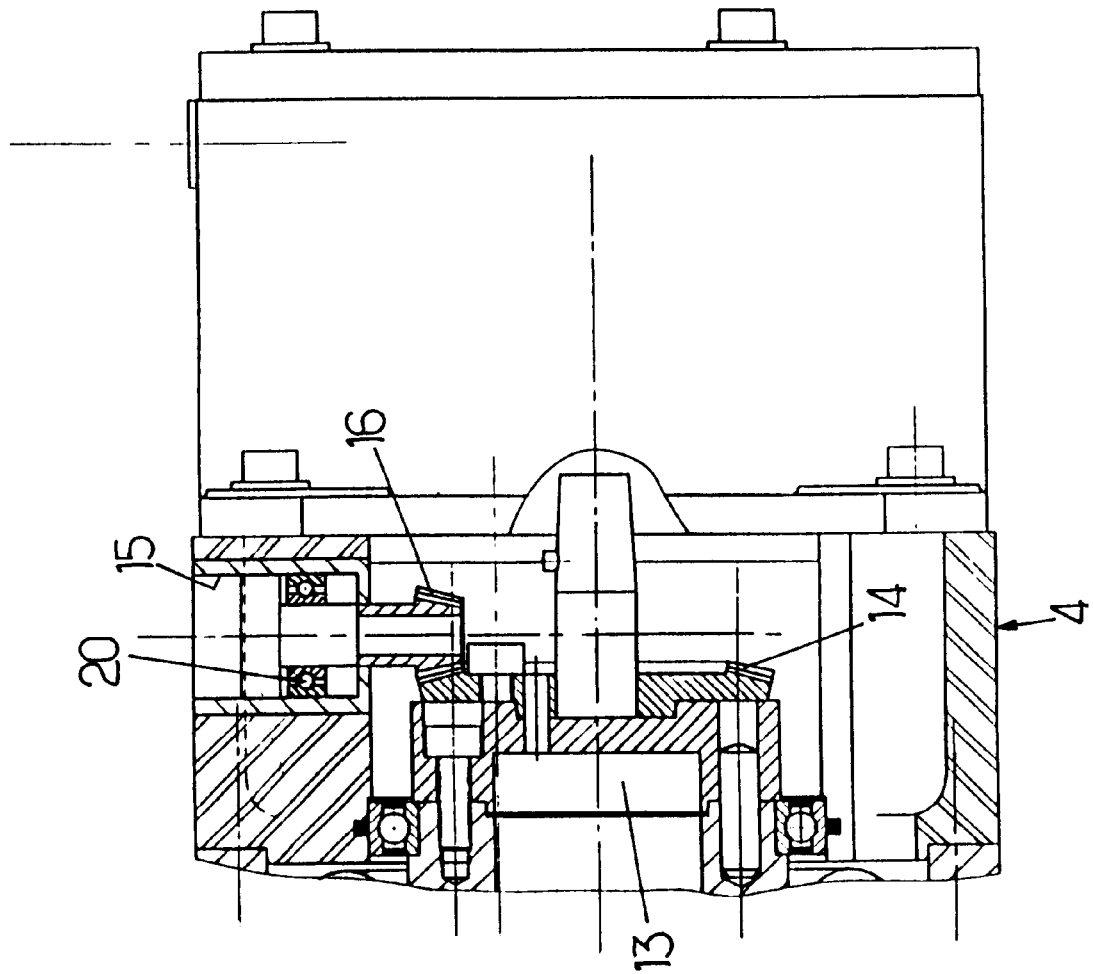
FIG. 7 is a view similar to the previous one, of the bevel gear variant, according to which the motor casing contains a set of teeth which can be operated by a key and permanently engaged with the gear wheel on the motor shaft.

FIG. 7 describes the variant according to which the motor casing 4 contains a set of teeth 16 of the bevel gear type which can also be rotated by a key, this set of teeth being permanently meshed with the bevel gear 14 on the motor shaft and for that reason being mounted in a bearing 20 in the opening 15.

Whatever the type of embodiment, it goes without saying that the operation as a whole would be the same if the screw were integral with the rotor 11 and rotated with it, and the nut capable of translational motion.

This being so, the main advantages of the invention are the following:

manual operation is possible on motors with integral screw and the slaving device at the end of the shaft, whatever the type of encoder or resolver used;

it is possible to operate with a larger number of slaving devices and therefore with a wider range of equipment;

manual operation is robust and allows a substantial drive torque;

several access openings can easily be provided on the casing for rotating the motor shaft;

incorporating this manual operation increases the size of the equipment only slightly;

the cost remains moderate compared with previous solutions;

the clamp can easily be moved manually to its stop in the closed or open position, to allow an instrument measuring the opening to be zeroed;

it is also possible to free the motor when it loses its datum points, comes to the end of its travel and locks, whether the origin of the locking is mechanical or electrical, or is due to a stoppage in the software; in the special case of welding electrodes, manual intervention will also be possible to free the electrodes when they have stuck to the parts, which would not be possible with the motor.

What is claimed is:

1. An electric motor device for powering a spot welding clamp having articulated arms which have welding electrodes, said electric motor comprising a casing, a rotor coupled to a rotating shaft which has two ends and is connected to said clamp, in order to control the welding electrodes carried by said articulated arms, to open the welding electrodes, to close the welding electrodes and to clamp the welding electrodes onto a part by a converting system extending through the motor, this system converting the rotating motion of said shaft into translating motion of a mechanism operating the clamp, said electric motor being linked to a slaving device coupled to the rotor of the motor, wherein the slaving device is arranged at one of said ends of the motor shaft and the shaft is fitted with a gear wheel which can be operated from the outside, for rotating it manually through at least one circular opening of the casing, this opening being offset with respect to the motor shaft, wherein the gear wheel can be rotated by a key, said key having a set of teeth which can engage with said gear wheel.

2. A device according to claim 1, wherein the motor casing contains a set of teeth which can be rotated by the key through said circular opening and at the same time be made to engage with the gear wheel on said end of the shaft, said set of teeth and gear wheel being disengaged from each other when the key is withdrawn by the action of a spring or of inertia.

3. A device according to claim 1, wherein the motor casing contains a set of teeth which can be rotated by the key through said circular opening, this set of teeth being permanently engaged with the gear wheel.

4. A device according to claim 1, wherein the gear wheel is a bevel gear, and the opening has an axis which forms a certain angle with the motor shaft.

5. A device according to claim 4, wherein the certain angle is 90°.

6. A device according to claim 1, wherein the gear wheel is cylindrical and meshes with a cylindrical pinion which can be operated through the opening.

7. A device according to claim 6, wherein the opening has an axis which is parallel to the motor shaft.

* * * * *